(12) United States Patent
Sasahara

(10) Patent No.: US 9,529,474 B2
(45) Date of Patent: Dec. 27, 2016

(54) INTERFACE APPARATUS AND SYSTEM

(71) Applicant: TOSHIBA TEC KABUSHIKI KAISHA, Shinagawa-ku, Tokyo (JP)

(72) Inventor: Katsuya Sasahara, Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/640,097

(22) Filed: Mar. 6, 2015

(65) Prior Publication Data
US 2016/0259463 A1 Sep. 8, 2016

(51) Int. Cl.
*G06F 3/041* (2006.01)
*H04B 5/00* (2006.01)
*G06K 7/10* (2006.01)
*G06F 3/01* (2006.01)

(52) U.S. Cl.
CPC ........... *G06F 3/0416* (2013.01); *H04B 5/0062* (2013.01); *G06F 3/016* (2013.01); *G06F 3/041* (2013.01); *G06K 7/10366* (2013.01); *G06K 7/10386* (2013.01)

(58) Field of Classification Search
USPC .............. 340/10.1, 407.1; 345/156, 173, 179
See application file for complete search history.

(56) References Cited

U.S. PATENT DOCUMENTS

| 2013/0271265 A1* | 10/2013 | Finn | H01Q 1/2225 340/10.1 |
| 2014/0002417 A1* | 1/2014 | Yoshida | G06F 3/044 345/174 |
| 2014/0285421 A1* | 9/2014 | Colakoglu | G06F 3/002 345/156 |
| 2015/0199047 A1* | 7/2015 | Lai | G06F 3/044 345/174 |

FOREIGN PATENT DOCUMENTS

JP 2005-261843 9/2005

* cited by examiner

*Primary Examiner* — Leon-Viet Nguyen
(74) *Attorney, Agent, or Firm* — Amin, Turocy & Watson LLP

(57) ABSTRACT

According to one embodiment, an interface apparatus includes a function device, plural conductive elements regularly arranged on a surface of the interface apparatus, and a control part. The function device receives an operation from a user and acquires first data based on the operation of the user. The control part converts the first data acquired from the function device into an arrangement pattern coincident with the first data, and controls to energize a conductive element at a position coincident with the arrangement pattern among the plural conductive elements.

8 Claims, 8 Drawing Sheets

INTERFACE APPARATUS AND SYSTEM

FIELD

Embodiments described herein relate generally to a technique to change an input method in a touch panel display.

BACKGROUND

Hitherto, there is a communication tool (computer) in which a touch panel display is built in a top board surface of a flat desk. A user operates the touch panel display in the top board surface, and performs a meeting or the like while confirming display contents.

According to the meeting contents, there is, for example, a state in which a credit card of a customer is read and a settlement process is performed, or a state in which an RFID (radio Frequency identifier) tag is read, or a password number is inputted. In this case, hitherto, a hardware device for performing these is required to be newly built in, or an existing device is required to be physically arranged. Thus, troublesomeness increases because of the space, securement of power reception and the like. Besides, the original easiness and simple operability of the touch panel display are lost.

DETAILED DESCRIPTION

Figure 1:
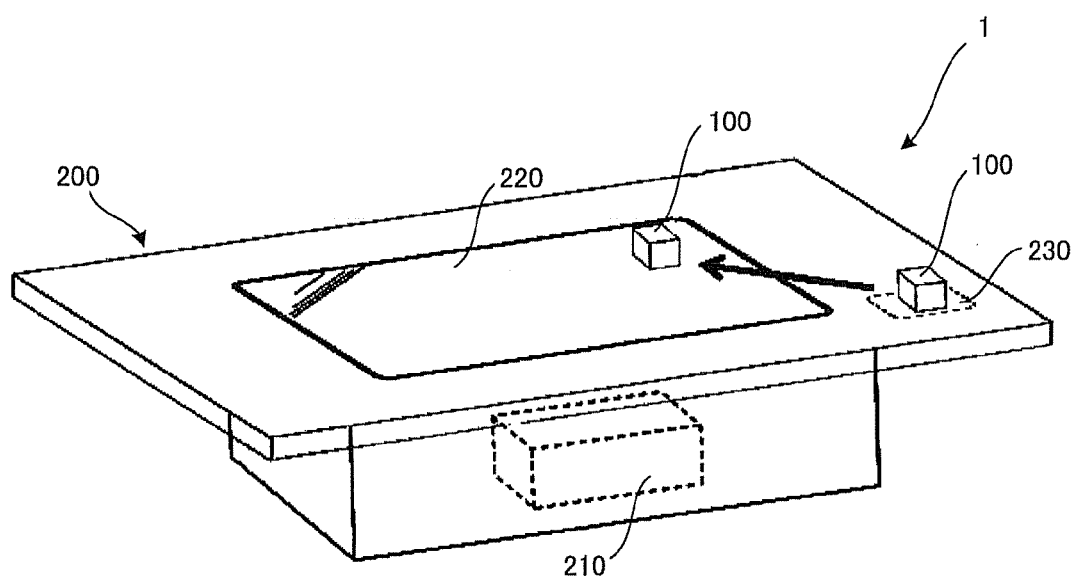
FIG. 1 is an outer appearance view showing a structural example of a system of an embodiment.

In general, according to one embodiment, an interface apparatus includes a function device, plural conductive elements regularly arranged on a surface of the interface apparatus, and a control part. The function device receives an operation from a user and acquires first data based on the operation of the user. The control part converts the first data acquired from the function device into an arrangement pattern coincident with the first data, and controls to energize a conductive element at a position coincident with the arrangement pattern among the plural conductive elements.

The interface apparatus of the embodiment roughly includes three units. A first unit is, for example, a card reader or an RFID reader, and is a device which physically receives an operation from a user and acquires data, such as card information, based on the operation of the user. The first unit is called a function device in this embodiment. A second unit converts the data from the function device into an input to a touch panel display and transmits to a desktop information processing apparatus. Besides, the second unit converts a light emission pattern of the touch panel display into data and outputs to the function device. A third unit is a power supply unit for supplying power to the interface apparatus. The user places the interface apparatus on the touch panel display of the desktop information processing apparatus. By this, the both perform data transmission and reception.

The interface apparatus includes plural conductive elements arranged in a matrix form, and switches for switching a conductive element to which current is to be flowed among the plural arranged conductive elements. The interface apparatus controls energization/non-energization of the plural arranged conductive elements by switching ON/OFF of the switches. The touch panel display of the desktop information processing apparatus detects which of the conductive elements is energized. By this, a pattern simulating a touch operation of the user is inputted to the touch panel display of the desktop information processing apparatus.

On the other hand, in data transmission from the desktop information processing apparatus to the interface apparatus, an image pattern (light emission pattern) displayed on the touch panel display is read by light receiving elements of the interface apparatus. The interface apparatus specifies data coincident with the light emission pattern, and treats this data as the data transmitted by the desktop information processing apparatus.

The interface apparatus of the embodiment and the desktop information processing apparatus transmit and receive data by wireless. By this, dust proofing and drip proofing are facilitated. Besides, the desktop information processing apparatus adopts an existing electrostatic capacitance type multi-touch display. No limitation is made to the desktop type as long as the information processing apparatus is a computer including the touch panel display.

The size, position and angle of a display image can be adjusted according to the position and direction of the interface apparatus.

Hereinafter, an embodiment will be described. FIG. 1 is a view showing a structural example of the embodiment. A communication system 1 of the embodiment includes an interface apparatus 100 and a desktop information processing apparatus 200.

The desktop information processing apparatus 200 includes an electrostatic capacitance type touch panel display 220 at the center part of a top board surface and a power feeding unit 230 at a corner part of the top board surface. A processing part 210 controls the respective units. The processing part 210 is a computer including a processor 211 and a memory 212 described later.

The interface apparatus 100 is placed on the power feeding unit 230 at non-use time and is charged in non-contact. Besides, the interface apparatus 100 is placed on the touch panel display 220 at use time.

Figure 2:
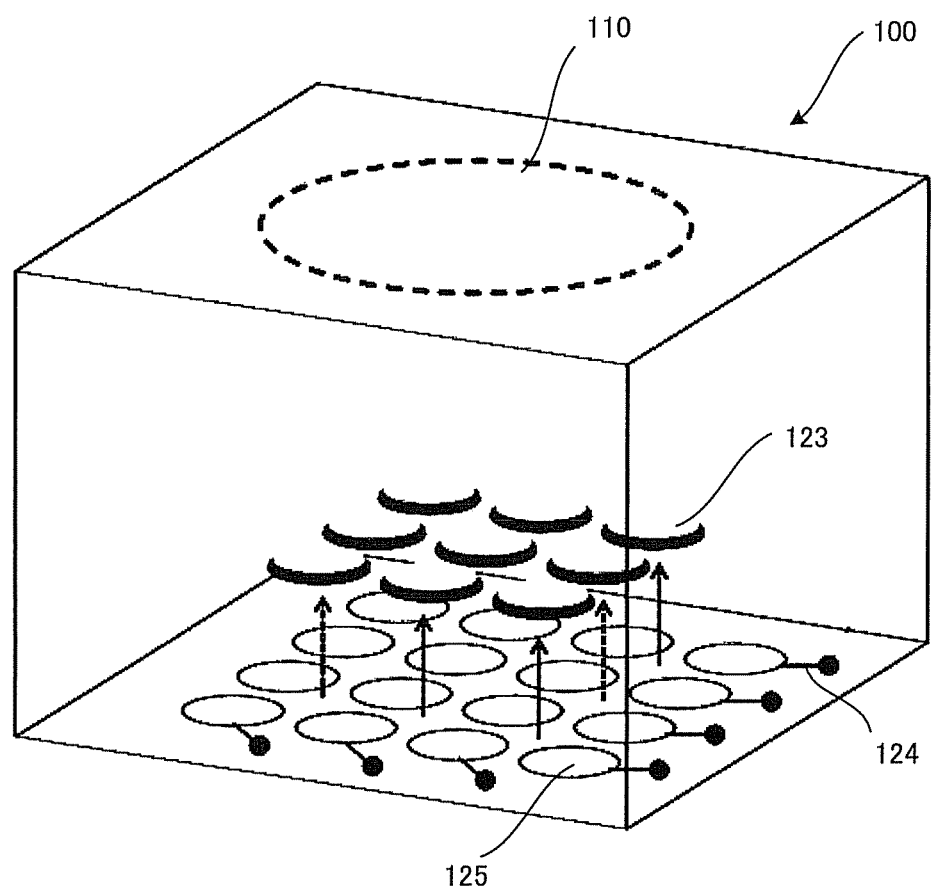
FIG. 2 is a block diagram showing the system structural example of the embodiment.
Figure 3:
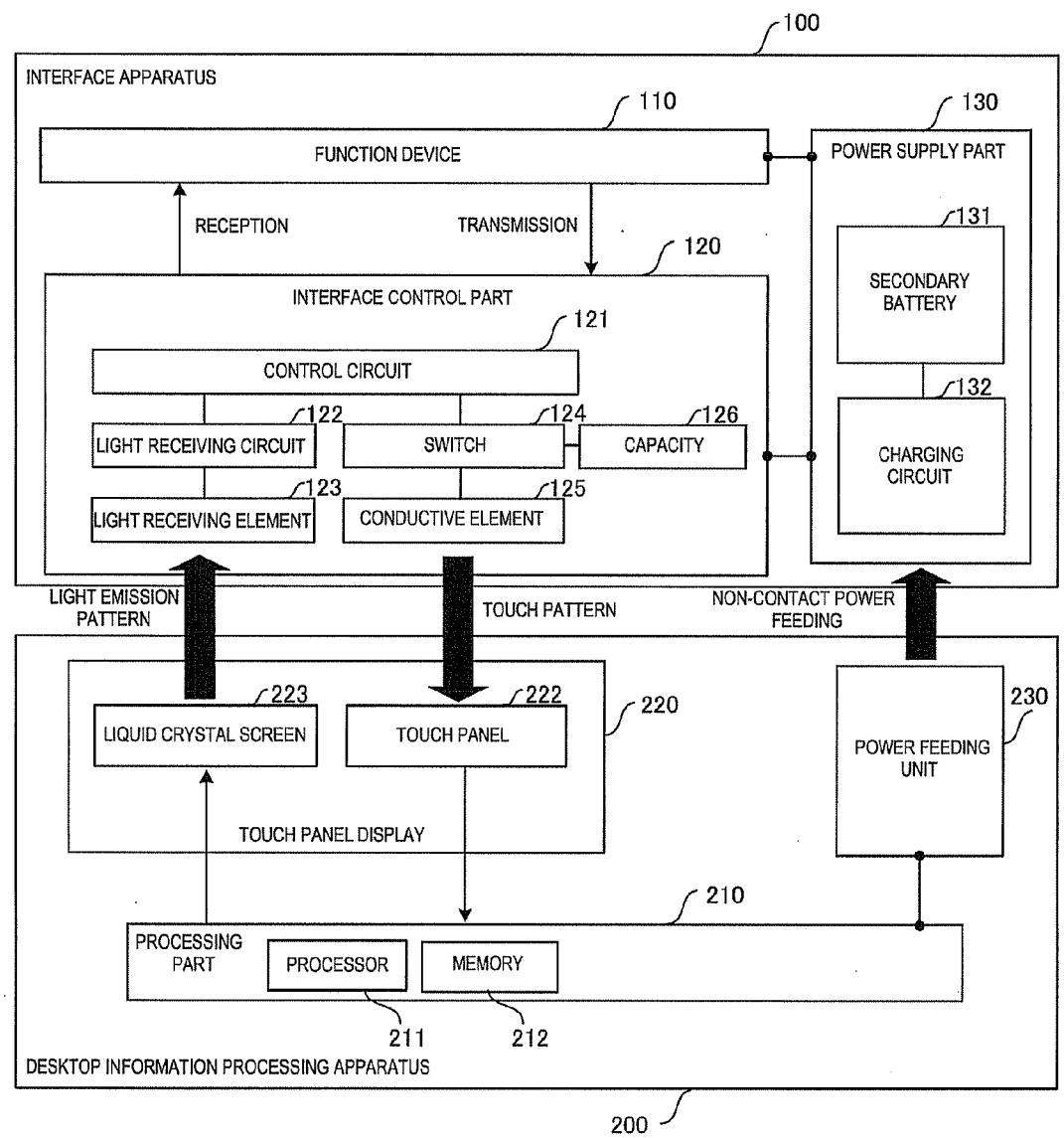
FIG. 3 is a schematic view showing an interface apparatus of the embodiment and an arrangement example of conductive elements and light receiving elements.
Figure 4:
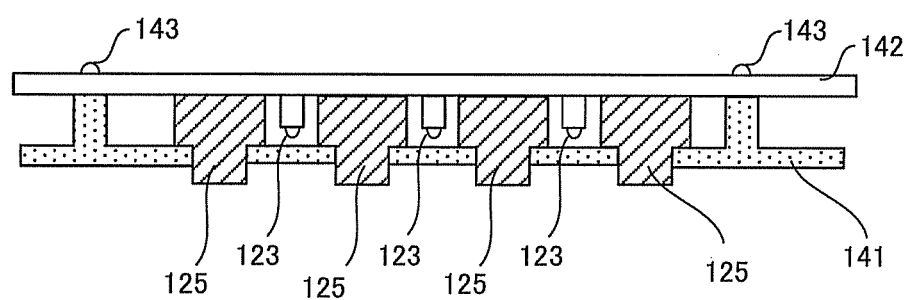
FIG. 4 is a schematic view showing a section relating to the conductive elements and the light receiving elements of the interface apparatus of the embodiment.

FIG. 2 is a block diagram showing a structural example of the system 1, and FIG. 3 is a view showing an arrangement example of conductive elements and light receiving elements of the interface apparatus 100. FIG. 4 is a view showing a section relating to the conductive elements and the light receiving elements of the interface apparatus 100.

The interface apparatus 100 includes a function device 110, an interface control part 120 and a power supply part 130. The function device 110 is a unit to receive an operation of a user. A specific mode thereof will be described later.

A conductive element 125 of the interface control part 110 causes a faint current to flow to the touch panel display 220 in the desktop information processing apparatus when being energized. The current flowing at this time is comparable to a current flowing when a person touches the touch panel display. The touch panel 222 receives data input simulating a human fingertip by detecting the faint current. Incidentally, the conductive element 125 of the embodiment is an elastic body, and for example, a powder of conductive material or a short fiber is mixed in a rubber material.

There are a plurality of the conductive elements 125, and as shown in FIG. 3 and FIG. 4, the conductive elements are horizontally and vertically regularly arranged in a matrix form. A switch 124 is connected to each of the conductive elements 125. A control circuit 121 controls ON/OFF of the switch 124. The control circuit 121 switches ON/OFF of the switch 124 and controls whether or not the faint current flows through the conductive element 125.

A light receiving element 123 is a monocular light receiving element to receive light irradiated from a liquid crystal screen 223 of the desktop information processing apparatus 200. A light receiving circuit 122 electrically converts the received light and outputs to the control circuit 121. There are a plurality of the light receiving elements 123. As shown in FIG. 3, the light receiving elements 123 are respectively arranged between the conductive elements 125, and are horizontally and vertically regularly arranged in a matrix form (see also FIG. 4).

When the function device 110 includes a touch panel, a capacity 126 detects an electrostatic capacity change at a position where the user depresses the touch panel, and controls ON/OFF of the switch 124 corresponding to the detection position. The capacity 126 turns ON the switch 124 located at the place where the electrostatic capacity changes.

Here, FIG. 4 will be described. A printed board 142 includes the light receiving circuit 122 and the control circuit 121 shown in FIG. 2, and is fixed to a bottom cover 141 by screws 143. The conductive elements 125 and the light receiving elements 123 are directly connected to the printed board 142. As stated above, in this embodiment, the conductive elements 125 and the light receiving elements 123 are in contact with and connected to the same board. A lower surface part of the conductive element 125 protrudes downward from the bottom cover 141 forming the housing surface of the interface apparatus 100. Since the lower surface protrudes, when the interface apparatus 100 is placed on the touch panel display 220 of the desktop information processing apparatus 200, the conductive element 125 and the touch panel 222 are in direct contact.

A return is made to the description of the block diagram of FIG. 2. The power supply part 130 is a unit to supply power to the function device 110 and the interface control part 120. The power supply part 130 includes a secondary battery 131 and a charging circuit 132. The power supply part receive power supplied from the power feeding unit 230 of the desktop information processing apparatus 200 in a non-contact manner, and stores the power by the secondary battery 131. When the interface apparatus 100 moves from the power feeding unit 230 onto the touch panel display 220, the function device 110 and the interface control part 120 operate while using the secondary batter 131 as the power source.

The description of the structure of the desktop information processing apparatus 200 will be continued with reference to FIG. 2. The desktop information processing apparatus 200 includes the touch panel display 220, the processing part 210 and the power feeding unit 230. The touch panel display 220 is positioned at the center of the top board surface (see FIG. 1), and includes the touch panel 222 and the liquid crystal screen 223. The touch panel 222 is of an electrostatic capacitance type, and outputs a position where an electrostatic capacitance change is detected to the processing part 210. The liquid crystal screen 223 is a flat liquid crystal panel, and the touch panel 222 is laminated and arranged on an upper layer thereof.

The power feeding unit 230 supplies power to the power supply part 130 of the interface apparatus 100 in a non-contact manner. Incidentally, the power feeding unit 230 may include an electrode terminal and may supply power by physical contact with the terminal. The processing part 210 is a computer, and includes at least a processor 211 and a memory 212. The memory 212 includes a main storage device to store information volatilely and an auxiliary storage device to store information nonvolatilely.

An operation when data is transmitted from the interface apparatus 100 to the desktop information processing apparatus 200 will be described. The control circuit 121 of the interface control part 120 receives data inputted from the user by the function device 110, and converts the data into a previously defined arrangement pattern (ON/OFF pattern) for conduction. In this embodiment, the data and the arrangement pattern are assumed to be previously correlated. For example, the control circuit 121 may store the correspondence relation.

The control circuit 121 controls ON/OFF of the switches 124 in accordance with this arrangement pattern. The conductive elements 125 arranged in the matrix form are respectively controlled into energization or non-energization by switching of the switches 124. For example, when the control circuit 121 inputs numerical data "12345", the control circuit generates or acquires an arrangement pattern corresponding to the numerical value "1", and controls the switches 124. Next, the control circuit 121 generates or acquires an arrangement pattern corresponding to the numerical value "2" and controls the switches 124. This is continuously performed until the numerical value "5". Of course, the generated arrangement patterns are respectively different from each other. By this, the conductive elements 125 arranged in the matrix form are brought into the energization/non-energization states in the different patterns of "1" to "5".

The touch panel 222 of the desktop information processing apparatus 200 regards the pattern (position where energization occurs) as a fingertip contact position, that is, a touch pattern and outputs to the processing part 210. The processing part 210 converts the pattern into data of "1" to "5" in accordance with the previously defined correspondence relation between the touch pattern and the numerical data. By this operation, the interface apparatus 100 transmits the numerical data "12345" to the desktop information processing apparatus 200.

Next, an operation when data is transmitted from the desktop information processing apparatus 200 to the interface apparatus 100 will be described. When the desktop information processing apparatus 200 transmits, for example, a processing result to the interface apparatus 100, the processing part 210 converts the transmitted data into a previously defined light emission pattern. The processing part 210 causes the liquid crystal screen 223 to emit light in accordance with this pattern. For example, when the data to be transmitted is "12345", the processing part 210 first generates a light emission pattern of the numerical value "1", and controls the liquid crystal screen 223 so that light is emitted in this pattern. Next, the processing part 210 generates a light emission pattern of the numerical value "2", and controls the liquid crystal screen 223 so that light is emitted in this pattern. This is continuously performed until the numerical value "5". Of course, the numerical data are respectively converted into the different light emission patterns. By this, the light receiving elements 123 of the interface apparatus 100 arranged in the matrix form continuously receive the different light emission patterns of "1" to "5". The control circuit 121 converts the patterns into data of "1" to "5" in accordance with the previously defined correspondence relation between the light emission pattern and the data. By this operation, the desktop information processing apparatus 200 transmits the numerical data "12345" to the interface apparatus 100.

By the above operation, the interface apparatus 100 and the desktop information processing apparatus 200 can perform bidirectional communication.

Figure 5:
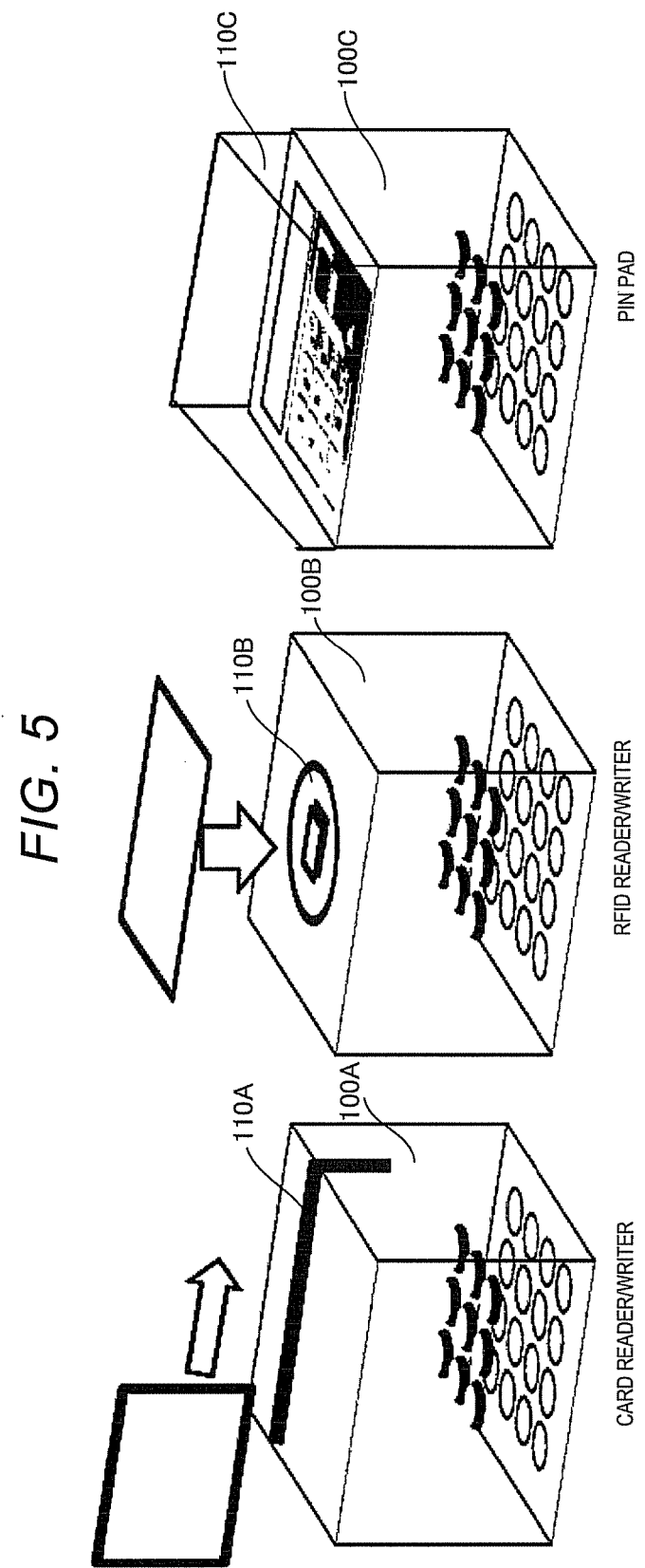
FIG. 5 is a view exemplifying modes of cases where various function devices are applied.

FIG. 5 is a view exemplifying modes of the function device 110. An interface apparatus 100A includes a card reader/writer 110A as the function device. When the user slides a card through a reading part, the interface apparatus 100A transmits the read card information to the touch panel 222 of the desktop information processing apparatus 200 through the conductive elements 125. The touch panel 222 outputs detected position information to the processing part 210, and the processing part 210 generates numerical data (card information) from the touch pattern of the position information. The card reader/writer 110A can be made to function also as a writer. In this case, the processing part 210 of the desktop information processing apparatus 200 generates or acquires data to be written in the card. The processing part 210 generates a light emission pattern based on the written data, and causes the liquid crystal screen 223 to emit light in accordance with the pattern. The light receiving elements 123 of the interface apparatus 100 receive the light emitted from the liquid crystal screen 223. The control circuit 121 converts the light into numerical data and outputs to the card reader/writer 110A. The card reader/writer 110A uses the writer function and writes the data into the inserted card.

An interface apparatus 100B shown in FIG. 5 has an apparatus structure in which the function device 110 is an RFID card reader/writer 110B. The RFID card reader/writer 110B reads a card placed over the interface apparatus 100B, and the interface control part 120 transmits the read value to the desktop information processing apparatus 200. On the other hand, the interface control part 120 receives numerical data generated or acquired by the desktop information processing apparatus 100, and the RFID card reader/writer 110B writes the numerical data into the card. The transmission and reception between the interface apparatus 100B and the desktop information processing apparatus 100 is similar to that of the interface apparatus 100A.

An interface apparatus 100C has an apparatus structure in which the function device 110 is a PIN pad 110C for password number input. The PIN pad 110C acquires a key value manually inputted by the user, and the interface control part 120 transmits the input value to the desktop information processing apparatus 200. The transmission method is similar to that of the interface apparatus 100A. An object with ID information may be used other than the interface apparatuses 100A to 100C.

Figure 6:
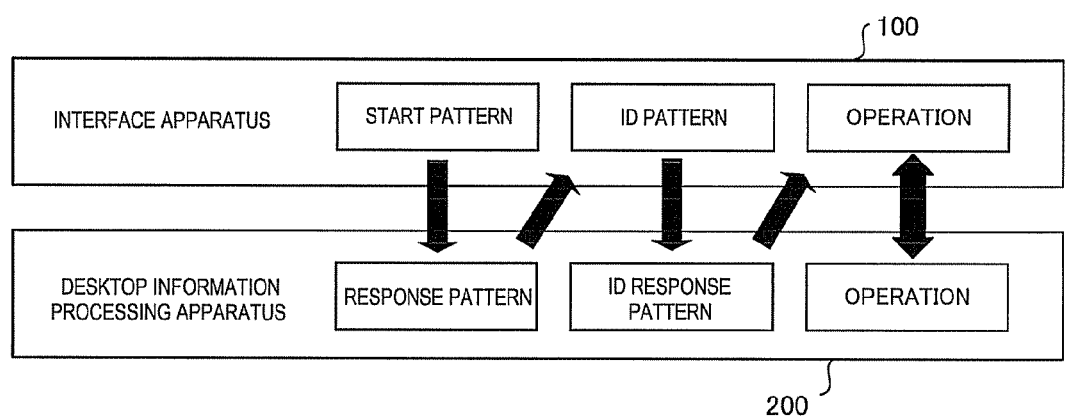
FIG. 6 is a view exemplifying a negotiation operation of the embodiment.

FIG. 6 is a view showing an operation of negotiation between the interface apparatus 100 and the desktop information processing apparatus 200. The negotiation is a series of processes to notify the placement position, direction, type and the like of the interface apparatus 100 on the touch panel display 220 before transmission and reception of specific data.

First, when the interface apparatus 100 is placed on the touch panel display 220, the control circuit 121 controls the switches 124 and forms a start pattern. The start pattern is a pattern for specifying the placement position and direction of the interface apparatus 100 on the touch panel display 220. Originally, the interface apparatus is preferably placed so that respective sides forming a placement surface (surface in contact with and facing the touch panel display 220) of the interface apparatus 100 are parallel to the coordinate axes (X-axis, Y-axis) of the touch panel display 220 and is preferably placed at a previously determined position. However, this does not necessarily occur. Thus, in this embodiment, the desktop information processing apparatus 200 specifies the coordinates of the four corners of the placement surface of the interface apparatus 100 and the coordinates as reference for the direction, so that the placement position and direction of the interface apparatus 100 are specified. That is, the control circuit 121 generates the arrangement pattern (start pattern) to specify the four corners and the reference for the direction, and energizes the conductive elements 125 in accordance with this pattern.

The processing part 210 acquires the coordinate information of the four corners and the reference coordinates for the direction from the touch panel 222, and specifies the position and direction of the interface apparatus 100. After specifying, the processing part 210 causes the liquid crystal screen 223 to emit a response pattern.

When recognizing that the light receiving elements 123 receive the response pattern, the control circuit 121 generates an ID pattern, and controls the energization of the conductive elements 125 by switching ON/OFF of the switches 124 in accordance with this pattern. The ID pattern is information to specify the type of the function device 110. Based on the ID pattern, the processing part 210 specifies what operation is performed by the function device 110 and what information is acquired from the user. After specifying, the processing part 210 causes the liquid crystal screen 223 to display the response pattern.

After the negotiation operation, the both perform data transmission and reception according to the type of the function device 110. That is, the interface apparatus 100 receives the operation of the user and transmits to the desktop information processing apparatus 200, and receives response data, such as results, from the desktop information processing apparatus 200.

Figure 7:
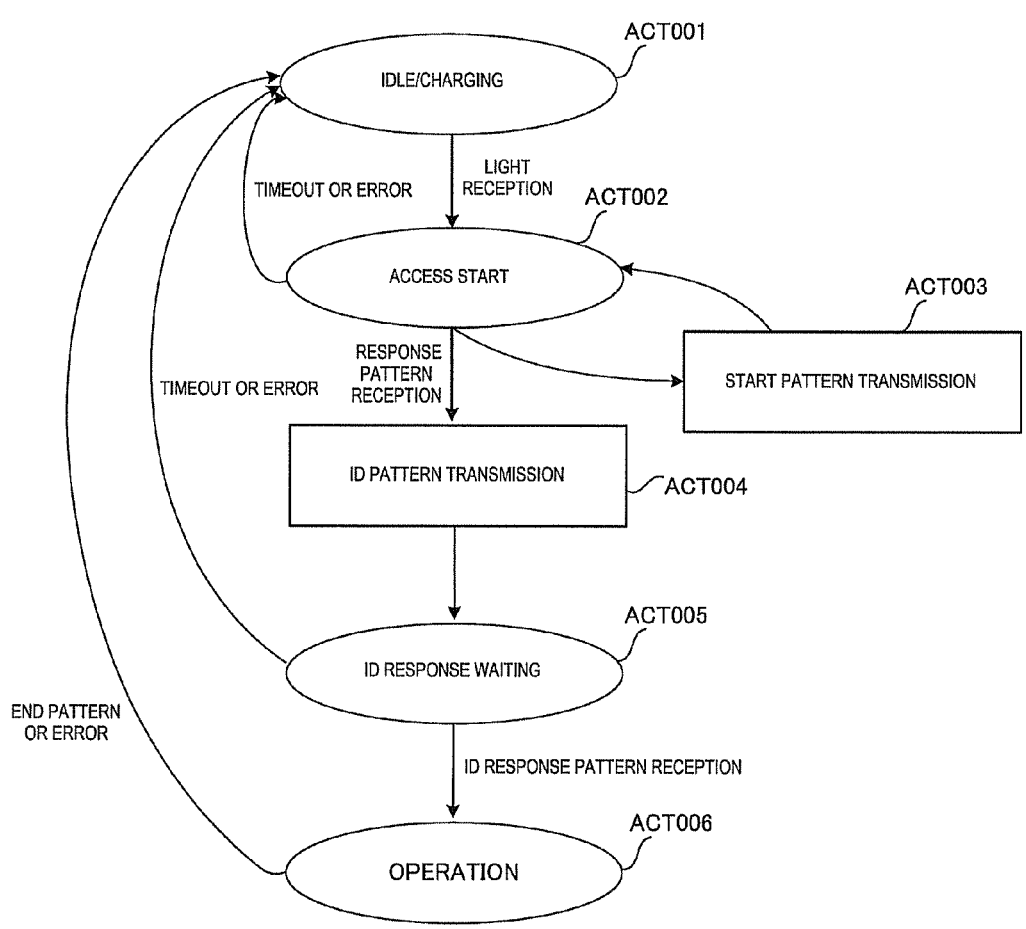
FIG. 7 is a view showing an operation example of the interface apparatus at the negotiation.

FIG. 7 is a view (state transition view) showing an operation of the negotiation of the interface apparatus 100. When the interface apparatus 100 is in an IDLE state or a charging state (ACT010), and when the light receiving elements 123 receive light, a transition occurs to an access start state (ACT002). The light reception means that the interface apparatus 100 is placed on the touch panel display 220 of the desktop information processing apparatus 200.

After ACT002, the interface control part 120 transmits the start pattern (ACT003), and keeps the access state (return to ACT002). When receiving the response pattern from the desktop information processing apparatus 200, the interface control part 120 transmits the ID pattern (ACT004) and transitions to an ID response waiting state (ACT005).

When receiving an ID response pattern from the desktop information processing apparatus 200, the interface control part 120 transitions to a user operation state (OPERATION) (ACT006).

When a timeout or an error occurs at ACT002 or ACT005, in this embodiment, a transition occurs to the IDLE state (to ACT001). Also when the interface control part 120 receives or transmits an end pattern at ACT006, or an error occurs, in this embodiment, a transition occurs to the IDLE state (to ACT001).

Figure 8:
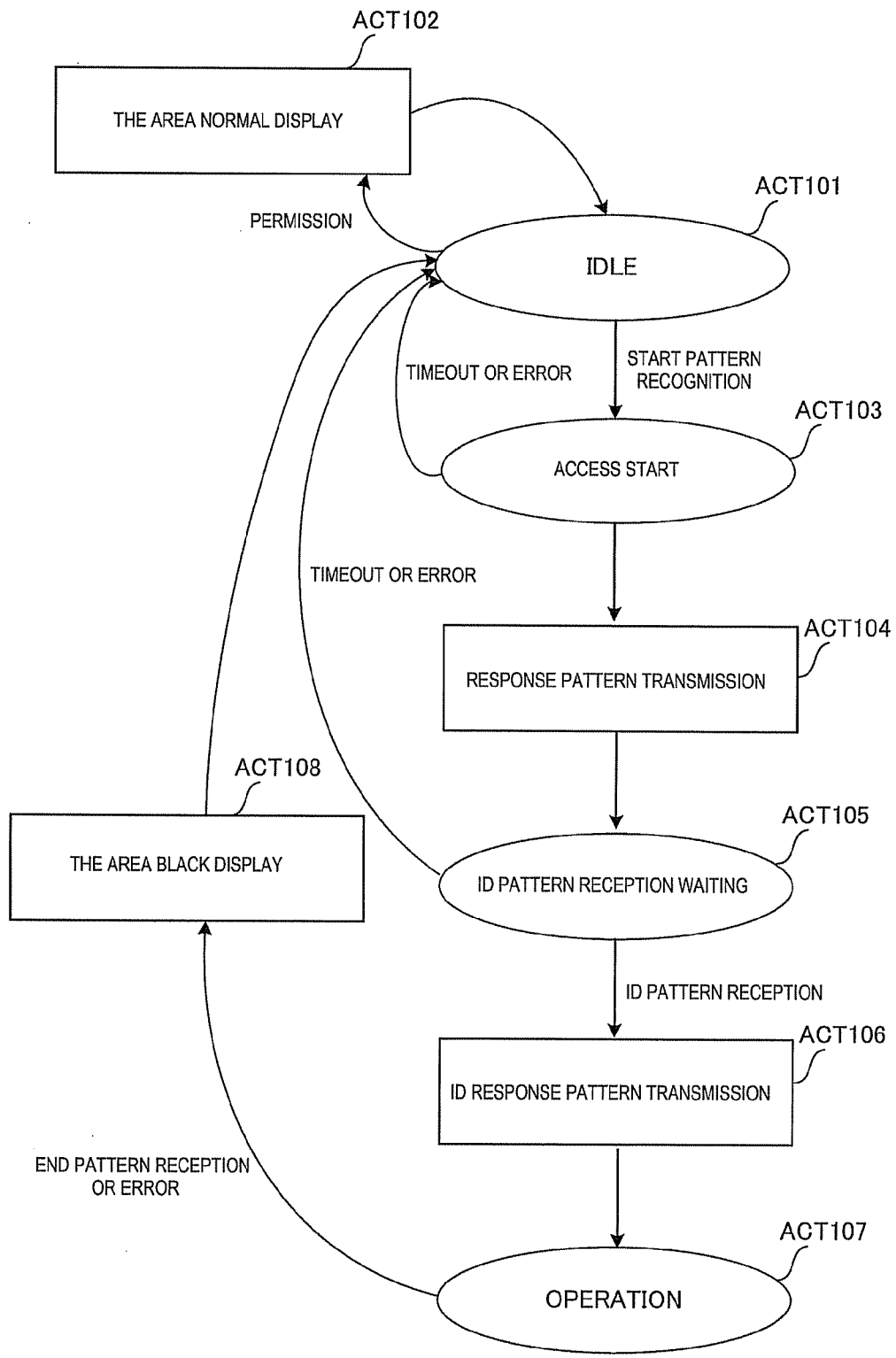
FIG. 8 is a view showing an operation example of a desktop information processing apparatus at the negotiation.

FIG. 8 is a view (state transition view) showing an operation of the negotiation of the desktop information processing apparatus 200. When the desktop information processing apparatus 200 is in an IDLE state (ACT101), the user performs a log-in operation or a specified operation. By this, at least a relevant area (area as a range in which the interface apparatus 100 is placed) of the liquid crystal screen 223 emits light (ACT102). When the touch panel 222 recognizes the start pattern in this state, the desktop information processing apparatus 200 transitions to an access state (ACT103). At this time, the processing part 210 specifies the placement position and direction of the interface apparatus 100. The liquid crystal screen 223 emits the response pattern based on the instruction of the processing part 210 (ACT104), and transitions to an ID pattern reception waiting state (ACT105).

When the touch panel 222 detects the ID pattern, the processing part 210 specifies the type of the interface apparatus 100, and causes the liquid crystal screen 223 to display the ID response pattern (ACT106). Thereafter, a transition occurs to a user operation state (OPERATION) (ACT107).

When a timeout or an error occurs at ACT103 or ACT105, in this embodiment, a transition occurs to the IDLE state (to ACT101). When the touch panel 222 receives the end pattern at ACT107 or an error occurs, the liquid crystal screen 223 displays the area in black based on the instruction from the processing part 210 (ACT108), and the desktop information processing apparatus 200 transitions to the IDLE state (to ACT101).

In the above description, the touch panel display 220 supports multi-touch, and the touch pattern is generated on the assumption that plural simultaneous touches are possible. However, the touch panel display may support only single touch. In this case, the control circuit 121 controls to turn on the switch 124 so that the original arrangement pattern is serially transmitted, that is, only one of the conductive elements 125 arranged in the matrix form is energized. This operation is continuously performed, so that the touch pattern is formed. The support for the single touch or multi-touch can be changed in the initial setting of the equipment or the like.

Besides, not only the touch operation but also a flick operation can be simulated by changing the size of the arrangement (matrix) and the number of the light receiving elements 122 and the conductive elements 125.

Although the light receiving element 223 of the embodiment is the monocular light receiving element, no limitation is made to this, and an image scanner may be used. When the light receiving element is the image scanner, the touch panel display 220 can increase data transfer amount in unit time by displaying a barcode, a two-dimensional code, or a recognition character in OCR (Optical Character Recognition).

According to the embodiment, hardware is not required to be built in the desktop information processing apparatus, and the external interface apparatus easy to handle can be provided.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An interface apparatus, comprising:
a function device which receives an operation from a user and acquires first data which is a single numeric data based on the operation of the user;
a plurality of conductive elements regularly arranged on a surface of the interface apparatus;
a control part which converts the first data acquired from the function device into a pre-defined arrangement pattern, that specifies pressing positions of a touch panel, corresponding with the first data, and controls to energize a conductive element at a position coincident with the arrangement pattern among the plurality of conductive elements; and
a power supply part which supplies power to the function device and the control part,
wherein the interface apparatus operates when the interface apparatus is positioned on a surface of a touch panel display of a computer and the plurality of conductive elements contact the surface of the touch panel display, and
wherein the control part generates an arrangement pattern for specifying a position and a direction of the interface apparatus on the touch panel display, controls to energize a conductive element at a position coincident with the arrangement pattern, and then controls to energize the conductive element at the position coincident with the arrangement pattern of the first data.

2. The apparatus according to claim 1, further comprising a plurality of light receiving elements which receive a light emission pattern from the touch panel display and are regularly arranged, wherein
the control part converts the light emission pattern into data coincident with the light emission pattern.

3. The apparatus according to claim 1, wherein the control part further generates the arrangement pattern for specifying a type of the function device.

4. The apparatus according to claim 1, wherein the function device is a device to read a card owned by the user.

5. The apparatus according to claim 1, wherein the function device is a device to read an RFID.

6. The apparatus according to claim 1, wherein the function device is a device including a PIN pad.

7. A system comprising a desktop information processing apparatus including a touch panel display on a top board surface and an interface apparatus, wherein
the interface apparatus comprises:
a function device which receives an operation from a user and acquires first data which is a single numeric data based on the operation of the user;
a plurality of conductive elements regularly arranged on a surface of the interface apparatus;
a control part which converts the first data acquired from the function device into a pre-defined arrangement pattern, that specifies pressing positions of a touch panel, corresponding with the first data, and controls to energize a conductive element at a position coincident with the arrangement pattern among the plurality of conductive elements; and
a power supply part which supplies power to the function device and the control part, and
when the interface apparatus is positioned on a surface of the touch panel display, and the plurality of conductive elements contact the surface of the touch panel display, the desktop information processing apparatus specifies the position of the energized conductive element among the plurality of conductive elements, and derives the first data based on the specified position.

8. The system according to claim 7, wherein
the interface apparatus further comprises a plurality of light receiving elements which receive a light emission pattern from the touch panel display and are regularly arranged,
the desktop information processing apparatus generates a light emission pattern coincident with second data to be notified to the interface apparatus, and causes the touch panel display to emit the light emission pattern, and
the control part of the interface apparatus converts the light emission pattern into data coincident with the light emission pattern and derives the second data.

* * * * *